US010297818B2

(12) United States Patent
Iwasaki (10) Patent No.: US 10,297,818 B2
(45) Date of Patent: May 21, 2019

(54) DEVICE AND METHOD FOR PRODUCING COMPOSITE ACTIVE MATERIAL POWDER USING A PRODUCTION DEVICE INCLUDING A ROTATING BODY WITH BLADES EACH HAVING A TAPERED SECTION AT AN END PART THEREOF ON A FRONT SIDE IN A ROTATION/MOVEMENT DIRECTION OF THE ROTATING BODY

(71) Applicant: TOYOTA JIDOSHA KABUSHIKI KAISHA, Toyota-shi, Aichi-ken (JP)

(72) Inventor: Masahiro Iwasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/717,226

(22) Filed: Sep. 27, 2017

(65) Prior Publication Data

US 2018/0047979 A1   Feb. 15, 2018

Related U.S. Application Data

(62) Division of application No. 15/146,207, filed on May 4, 2016, now abandoned.

(30) Foreign Application Priority Data

Jun. 1, 2015   (JP) .................................. 2015-111110

(51) Int. Cl.
*B01F 7/00* (2006.01)
*B01F 7/04* (2006.01)
(Continued)

(52) U.S. Cl.
CPC ........... *H01M 4/366* (2013.01); *B01F 7/0025* (2013.01); *B01F 7/00116* (2013.01); *B01F 7/04* (2013.01);
(Continued)

(58) Field of Classification Search
CPC ...... B01F 7/00116; B01F 7/0025; B01F 7/04; B01F 7/18; H01M 4/366; H01M 4/62;
(Continued)

(56) References Cited

U.S. PATENT DOCUMENTS 3,027,102 A * 3/1962 Lucke ...................... B01F 7/04
241/101.8
3,250,321 A * 5/1966 Root ...................... B01F 15/065
165/94
(Continued)

FOREIGN PATENT DOCUMENTS

DE            1102534 B   *  3/1961  ................ B01F 7/04
DE        1432028 A1   * 10/1968  ................ B01F 7/04
(Continued)

OTHER PUBLICATIONS

Qi (Tony) Zhou et al., "Effect of mechanical dry particle coating on the improvement of powder flowability for lactose monohydrate: A model cohesive pharmaceutical powder," Powder Technology 207 (2011), p. 414-421.
(Continued)

*Primary Examiner* — Charles Cooley
(74) *Attorney, Agent, or Firm* — Oliff PLC (57) ABSTRACT

A device produces a composite active material powder by coating active material or composite particle surfaces, which are obtained by coating the active material particle surfaces with an oxide-based solid electrolyte, with a sulfide-based solid electrolyte. The device includes: a storage body having a cylindrical inner wall surface, and a rotating body disposed in an internal space surrounded by the storage body inner wall surface, having a rotating shaft aligned with the internal space central axis, and which includes blades. Each blade end part has such a tapered section on a front side in the rotating body rotation/movement direction, that a thickness of the blade gradually tapers toward a blade end side, and each blade end part has such a curved end surface on a back side in the rotating body rotation/movement direction, that the curved end surface faces the storage body inner wall surface and is generally parallel thereto.

7 Claims, 3 Drawing Sheets

(51) Int. Cl.
*H01M 4/36* (2006.01)
*H01M 4/62* (2006.01)
*H01M 4/505* (2010.01)
*H01M 4/525* (2010.01)
*H01M 4/587* (2010.01)
*H01M 10/052* (2010.01)
*H01M 4/1391* (2010.01)
*H01M 10/0562* (2010.01)

(52) U.S. Cl.
CPC ......... *H01M 4/1391* (2013.01); *H01M 4/505* (2013.01); *H01M 4/525* (2013.01); *H01M 4/62* (2013.01); *H01M 4/587* (2013.01); *H01M 10/052* (2013.01); *H01M 10/0562* (2013.01)

(58) Field of Classification Search
CPC .... H01M 4/1391; H01M 4/525; H01M 4/505; H01M 10/0562; H01M 4/587; H01M 10/052
USPC ........................................ 366/325.92, 325.93
See application file for complete search history.

(56) References Cited

U.S. PATENT DOCUMENTS

| | | | | |
|---|---|---|---|---|
| 3,500,901 A | * | 3/1970 | Mery | B01F 15/068 165/86 |
| 4,233,676 A | * | 11/1980 | Lucke | B01F 7/00208 366/147 |
| 4,320,979 A | * | 3/1982 | Lucke | B01F 7/00158 366/329.1 |
| 9,387,640 B1 | * | 7/2016 | Rice | B29B 17/04 |
| 2003/0063521 A1 | * | 4/2003 | Kumar | B01F 7/00008 366/314 |
| 2006/0092762 A1 | * | 5/2006 | Casalmir | B01F 7/00008 366/314 |
| 2015/0138914 A1 | * | 5/2015 | Hughes | A01K 5/002 366/186 |
| 2016/0351899 A1 | * | 12/2016 | Iwasaki | H01M 4/366 |
| 2017/0282136 A1 | * | 10/2017 | Nielsen | A01K 5/002 |
| 2018/0155198 A1 | * | 6/2018 | Sato | C01B 25/14 |

FOREIGN PATENT DOCUMENTS

| | | | | |
|---|---|---|---|---|
| DE | 1507889 A1 | * | 2/1970 | ............... B01F 7/04 |
| DE | 1782585 A1 | * | 10/1971 | ............... A23G 1/10 |
| DE | 3711987 A1 | * | 10/1988 | ............... B01F 7/04 |
| DE | 19642659 A1 | * | 4/1998 | ............... B01F 7/04 |
| EP | 0836880 A1 | * | 4/1998 | .......... B01F 7/00125 |
| GB | 876158 A | * | 8/1961 | ............... B01F 7/04 |
| GB | 2056293 A | * | 3/1981 | ............... B01F 7/04 |
| JP | 01090023 A | * | 4/1989 | ............... B01F 7/04 |
| JP | H11-347428 A | | 12/1999 | |
| JP | 2010-180099 A | | 8/2010 | |
| JP | 01090023 A | | 8/2010 | |
| JP | 2014-154407 A | | 8/2014 | |
| JP | 2015-60767 A | | 3/2015 | |
| WO | 2014/122520 A1 | | 8/2014 | |

OTHER PUBLICATIONS

Jun. 28, 2017 Office Action Issued in U.S. Appl. No. 15/146,207.

\* cited by examiner

DEVICE AND METHOD FOR PRODUCING COMPOSITE ACTIVE MATERIAL POWDER USING A PRODUCTION DEVICE INCLUDING A ROTATING BODY WITH BLADES EACH HAVING A TAPERED SECTION AT AN END PART THEREOF ON A FRONT SIDE IN A ROTATION/MOVEMENT DIRECTION OF THE ROTATING BODY

BACKGROUND OF THE INVENTION

This is a Divisional of application Ser. No. 15/146,207 filed May 4, 2016, now abandoned. The entire disclosures of the prior applications are hereby incorporated by reference herein their entirety.

Technical Field

The present invention relates to a device for producing a composite active material powder and a method for producing a composite active material powder.

Background Art

In the field of all-solid-state batteries, there is an attempt to improve the performance of all-solid-state batteries, focusing on an interface between the electrode active material and the solid electrolyte material.

Examples of conventional methods for coating the surfaces of active material-containing particles with a sulfide-based solid electrolyte, include gas phase methods such as pulsed laser deposition (hereinafter may be referred to as PLD). However, the PLD method is generally slow in film-forming rate, so that it is remarkably low in productivity and is not practical. Also in the PLD method, the target of the sulfide-based solid electrolyte is turned into a plasma by laser irradiation. At this time, the composition of the sulfide-based solid electrolyte may be changed and may not be maintained.

Examples of other methods for coating the surfaces of active material-containing particles with a sulfide-based solid electrolyte, include mixing/kneading methods using a medium such as planetary ball mill. However, in such mixing/kneading methods using the medium, mechanical damage is applied in collision with the medium and, as a result, the surfaces of the active material-containing particles may be damaged. Therefore, to avoid such mechanical damage, there is a demand for mixing/kneading methods using no medium.

For example, in Patent Literature 1, as a technique to solve the above problem, a method for obtaining a composite powder is disclosed, in which different kinds of powders are bound by applying a mechanical action, which contains compression and sheer forces, to a raw material powder, which is made from various kind of powders, using a powder treating device.

Patent Literature 1: Japanese Patent Application Laid-Open No. 2010-180099

However, the use of the conventional composite active material powder production device as disclosed in Patent Literature 1, is problematic in that the internal resistance of a battery using the thus-obtained composite active material powder is large.

SUMMARY OF THE INVENTION

The present invention was achieved in light of the above circumstance. An object of the present invention is to provide a device that is able to produce a composite active material powder, which is able to reduce the internal resistance of a battery, and a method for producing the composite active material powder.

The device for producing a composite active material powder according to the present invention is a device for producing a composite active material powder by coating the surfaces of active material particles or composite particles, which are obtained by coating the surfaces of the active material particles with an oxide-based solid electrolyte, with a sulfide-based solid electrolyte, wherein the device includes: a storage body which has a cylindrical inner wall surface, and a rotating body which is disposed in an internal space that is surrounded by the inner wall surface of the storage body, which has a rotating shaft that is aligned with a central axis of the internal space, and which includes a plurality of blades, and wherein an end part of each blade has such a tapered section on a front side in a rotation/movement direction of the rotating body, that a thickness of the blade gradually tapers toward a blade end side, and the end part of each blade has such a curved end surface on a back side in the rotation/movement direction of the rotating body, that the curved end surface faces the inner wall surface of the storage body and is generally parallel to the inner wall surface of the storage body.

In the device for producing a composite active material powder according to the present invention, the width of the end surface of the end part of each blade is preferably in a range of 0.1 to 0.7 with respect to the thickness of the blade.

In the device for producing a composite active material powder according to the present invention, in the rotating shaft direction front view of the rotating body, the length of the end part of each blade in the radial direction of the rotating body is preferably 0.5 to 30 mm.

In the device for producing a composite active material powder according to the present invention, the width of the end surface of the end part of each blade is preferably 0.5 to 30 mm.

In the device for producing a composite active material powder according to the present invention, the clearance between the end surface of the end part of each blade and the inner wall surface of the storage body is preferably 0.5 to 10 mm.

In the device for producing a composite active material powder according to the present invention, in the rotating shaft direction front view of the rotating body, the inclined angle of the tapered section is preferably 10 to 80° to a tangent line at a point of intersection between the inclined surface of the tapered section and the inner wall surface of the storage body.

The method for producing the composite active material powder according to the present invention is a method wherein the surfaces of active material particles or composite particles, which are obtained by coating the surfaces of the active material particles with an oxide-based solid electrolyte, are coated with a sulfide-based solid electrolyte by preparing the device for producing composite active material powder, putting the sulfide-based solid electrolyte and any one of the active material particles and the composite particles into the storage body of the production device, and then rotating the rotating body.

In the method for producing the composite active material powder according to the present invention, the active material particles are preferably particles which contain at least any one of a cobalt element, a nickel element and a manganese element, and which further contain a lithium element and an oxygen element.

According to the present invention, a device that is able to produce a composite active material powder, which is able to reduce the internal resistance of a battery, and a method for producing the composite active material powder can be provided.

DETAILED DESCRIPTION OF THE INVENTION

1. Device for Producing Composite Active Material Powder

The device for producing a composite active material powder according to the present invention is a device for producing a composite active material powder by coating the surfaces of active material particles or composite particles, which are obtained by coating the surfaces of the active material particles with an oxide-based solid electrolyte, with a sulfide-based solid electrolyte, wherein the device includes: a storage body which has a cylindrical inner wall surface, and a rotating body which is disposed in an internal space that is surrounded by the inner wall surface of the storage body, which has a rotating shaft that is aligned with a central axis of the internal space, and which includes a plurality of blades, and wherein an end part of each blade has such a tapered section on a front side in a rotation/movement direction of the rotating body, that a thickness of the blade gradually tapers toward a blade end side, and the end part of each blade has such a curved end surface on a back side in the rotation/movement direction of the rotating body, that the curved end surface faces the inner wall surface of the storage body and is generally parallel to the inner wall surface of the storage body.

The inventor of the present invention has found that the internal resistance of a battery can be reduced more than ever before by shaping the form of the end part of each blade. The reason for this is supposed to be as follows: because the end part of each blade has the tapered section on the front side in the rotation/movement direction of the rotating body, a raw material powder can be efficiently supplied to a treating section (a minute space between the end part of each blade and the inner wall surface of the storage body); moreover, because the end part of each blade has such a curved end surface on the back side in the rotation/movement direction of the rotating body, that the curved end surface faces the inner wall surface of the storage body and is generally parallel to the inner wall surface of the storage body, the time required to grind the raw material powder becomes longer for the width of the end surface, and the efficiency of coating the surfaces of the active material particles or the below-described composite particles with the sulfide-based solid electrolyte (coating efficiency) is increased. As a result, it is considered that the internal resistance of a battery using the thus-obtained composite active material powder becomes low.

In the present invention, "coat" means to coat 40% or more of the surface of each active material particle or composite particle.

Also in the present invention, internal resistance means the sum of direct-current resistance, reaction resistance, diffusion resistance and other resistances.

Hereinafter, an embodiment of the composite active material powder production device of the present invention will be described.

Figure 1:
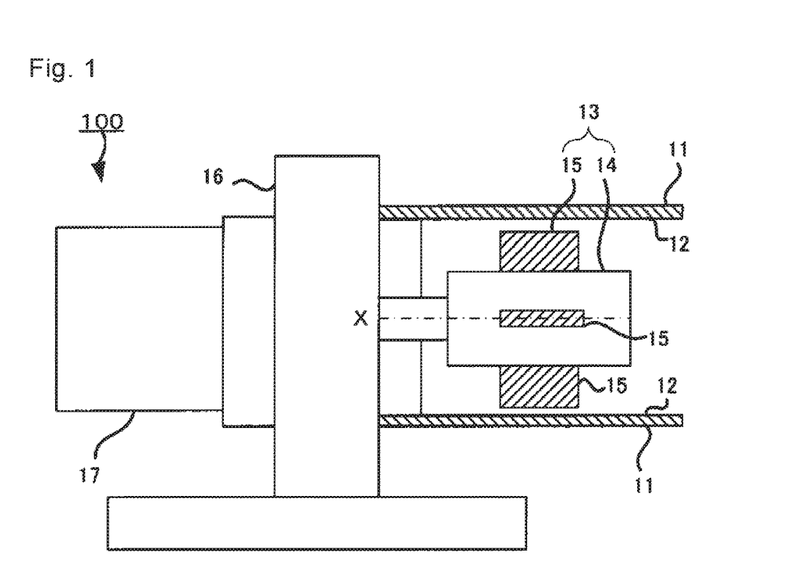
FIG. 1 is a schematic side view of the production device of the present invention.

FIG. 1 is a schematic side view of an embodiment of the production device of the present invention.

As shown in FIG. 1, a production device 100 includes a storage body 11, which has a cylindrical inner wall surface 12 and a laterally extending central axis X (indicated by an alternate long and short dash line in FIG. 1), and a rotating body 13, which is disposed in the internal space that is surrounded by the inner wall surface 12 of the storage body 11 and which is rotary driven around the central axis X. The rotating body 13 has a rotating shaft 14, which is aligned with the central axis X, and a plurality of blades 15, which extend outwardly in a radial direction from an outer peripheral part of the rotating shaft 14. One end of the rotating shaft 14 is supported by a bearing 16 and connected to a motor 17, which is a driving means. An opening is provided at the right end of the storage body 11, so that materials can be put into the storage body through the opening.

As needed, the external wall of the storage body 11 can be surrounded by a chiller pipe for circulating a temperature control fluid (not shown).

Figure 2:
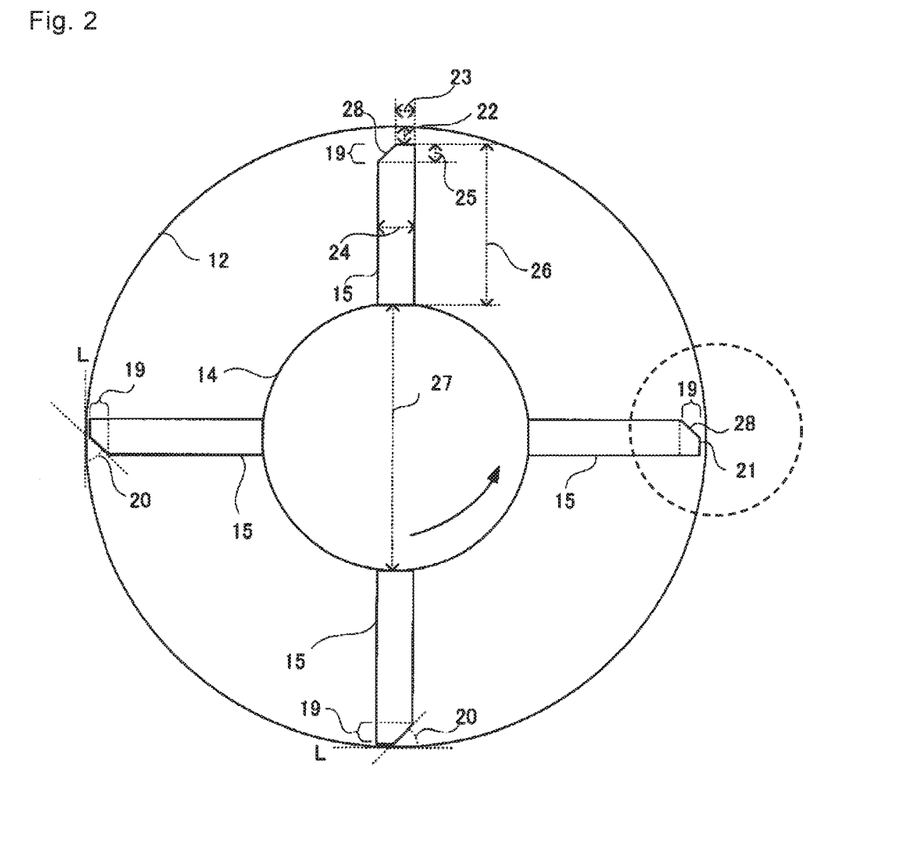
FIG. 2 is a schematic front view of a rotating body shown in FIG. 1.

FIG. 2 is a schematic front view of a rotating body shown in FIG. 1.

In FIG. 2, arrow indicates the rotation direction of the rotating body 13.

As shown in FIG. 2, each blade 15 has a leading side and a substantially planar trailing side in the rotation/movement direction of the rotating body 13 (denoted by the arrow in FIG. 2). An end part 19 of each blade 15 adjoins the leading side and the substantiality planar trailing side. The end part 19 of each blade 15 has such a tapered section on the leading side in the rotation/movement direction of the rotating body 13, that the thickness of the blade 15 gradually tapers toward a blade end. At the blade end, the end part 19 transitions into a curved end surface 21 that directly adjoins the substantially planar trailing side of the blade 15.

As shown in FIG. 2 (that is, in the rotating shaft direction front view of the rotating body 13 shown in FIG. 1), an inclined angle 20 of the tapered section is preferably 10 to 80° to a tangent line L at a point of intersection between an extended line extended from an inclined surface 28 of the tapered section in the inclined direction and the inner wall surface 12 of the storage body 11. From the viewpoint of increasing the amount of the raw material powder incorporated into a clearance 22, the inclined angle 20 is particularly preferably 30 to 60°.

Figure 5:
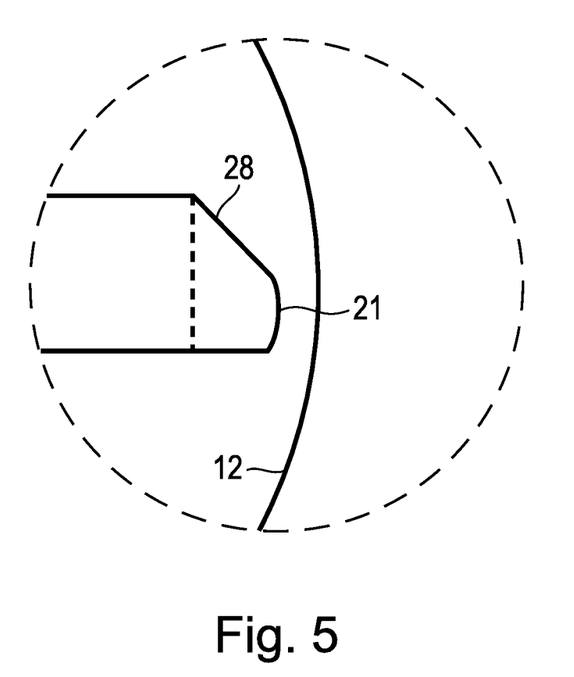
FIG. 5 is an enlarged view of the curved end surface of a blade of the present invention encircled in FIG. 2.

Also, the end part 19 of each blade 15 has the curved end surface 21 on the back side in the rotation/movement direction of the rotating body 13, such that the curved end surface 21 faces the inner wall surface 12 of the storage body 11 and is generally parallel to the inner wall surface 12 of the storage body 11, shown in FIG. 5. That is, by shaping the curved end surface 21 of the end part 19 of each blade 15 in the form of a curved surface that curves circularly around the inner wall surface 12 of the storage body 11, the clearance 22 between the curved end surface 21 of the end part 19 of each blade 15 and the inner wall surface 12 of the storage body 11 is generally kept constant, over the total length of the curved end surface 21. The reason for keeping the clearance 22 constant is to apply a uniform force to the powder. The reason for keeping the clearance 22 minute is to apply a stronger force to the powder by reducing the space for passing the powder therethrough. The clearances 22 between the inner wall surface 12 of the storage body 11 and the end parts 19 of the blades 15 can vary depending on the positions where the blades 15 are installed.

The clearance (minute space) 22 between the curved end surface 21 of the end part 19 of each blade 15 and the inner wall surface 12 of the storage body 11 is preferably 0.5 mm or more, particularly preferably 1 mm or more, and it is preferably 10 mm or less, particularly preferably 5 mm or less. If the clearance 22 is more than 10 mm, the space for passing the powder therethrough increases and cannot apply a strong mechanical action to the powder. On the other hand, if the clearance 22 is less than 0.5 mm, the amount of the powder which can be incorporated into the clearance 22 is small, so that a long treatment time is needed, and there is an increase in production cost. Also, the blades 15 may be brought into contact with the storage body 11, due to an unexpected vibration that is caused during operation by overload, etc.

As shown in FIG. 2 (that is, in the rotating shaft direction front view of the rotating body 13 shown in FIG. 1), a width 23 of the curved end surface 21 of the end part 19 of each blade 15 is 0.5 mm or more, particularly preferably 1 mm or more, and it is preferably 30 mm or less, particularly preferably 20 mm or less.

A thickness 24 of each blade 15 is preferably 1 mm or more, more preferably 2 mm or more, still more preferably 5 mm or more, and it is preferably 100 mm or less, more preferably 50 mm or less, still more preferably 20 mm or less.

The width 23 of the curved end surface 21 of the end part 19 of each blade 15 is preferably in a range of 0.01 to 0.95, more preferably in a range of 0.1 to 0.7, with respect to the thickness 24 of the blade 15.

A length 25 of the end part 19 of each blade 15 in the radial direction of the rotating body 13 is preferably 0.5 mm or more, more preferably 1 mm or more, still more preferably 3 mm or more, and it is preferably 3 0 mm or less, particularly preferably 20 mm or less.

A total length 26 of each blade 15 is preferably 10 mm or more, particularly preferably 15 mm or more, and it is preferably 600 mm or less, particularly preferably 400 mm or less.

The length 25 of the end part 19 of each blade 15 is preferably in a range of 0.002 to 1, more preferably in a range of 0.05 to 0.95, with respect to the total length 26 of each blade 15.

A diameter 27 of the rotating shaft 14 of the rotating body 13 is preferably 30 mm or more, particularly preferably 40 mm or more, and it is preferably 1000 mm or less, particularly preferably 500 mm or less.

Figure 3:
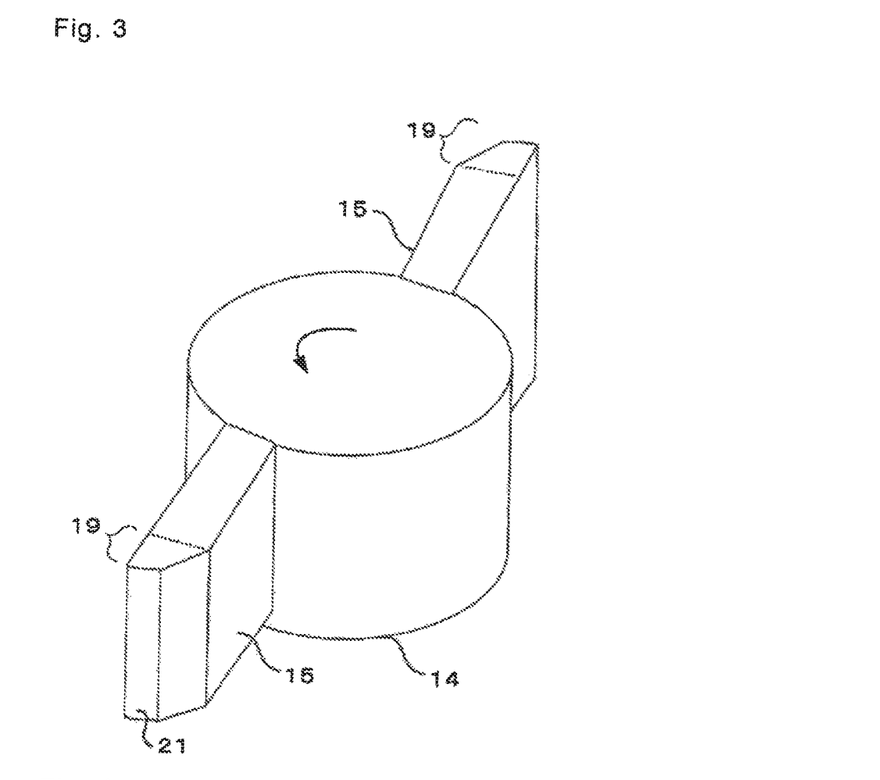
FIG. 3 is a schematic view of blades installed to a rotating shaft of a rotating body.

FIG. 3 is a schematic view of blades installed to a rotating shaft of the rotating body. An arrow shown in FIG. 3 indicates the rotation direction of the rotating body.

As shown in FIG. 3, each blade 15 is installed parallel to the rotating shaft 14.

Each blade 15 can be installed at an angle in relation to the rotating shaft 14. The number of the blades 15 installed to the rotating shaft 14 is not particularly limited. It can be appropriately determined depending on the scale of the device, the amount of the raw materials put into the production device, etc.

2. Method for Producing Composite Active Material Powder

The method for producing the composite active material powder according to the present invention is a method wherein the surfaces of active material particles or composite particles, which are obtained by coating the surfaces of the active material particles with an oxide-based solid electrolyte, are coated with a sulfide-based solid electrolyte by preparing the production device, putting the sulfide-based solid electrolyte and any one of the active material particles and the composite particles into the storage body of the production device, and then rotating the rotating body.

The production device that can be used in the production method of the present invention will not be described here, since it is the same as the device described above under "1. Device for producing composite active material powder".

The temperature inside the storage body is not particularly limited. Preferably, the temperature is controlled to 100° C. or less.

The peripheral speed of the rotating body is preferably 10 to 30 m/sec.

The rotating time of the rotating body is not particularly limited. For example, it can be 30 seconds to 3 hours.

The amount of the raw material powder put into the storage body is preferably set in a range of 5 to 95% of the inner volume of the treating space inside the storage body, so that the powder is more effectively subjected to a stirring action inside the storage body. The inner volume of the treating space inside the storage body means the volume of a space obtained by deducting the volume occupied by the rotating body from the inner volume of the storage body itself (that is, the substantial space inside the storage body, in which the powder can move around).

The amount of the sulfide-based solid electrolyte added is not particularly limited. It is preferably 5 to 25 parts by mass, with respect to 100 parts by mass of the active material particles or 100 parts by mass of the composite particles.

The production method of the present invention is advantageous in that it can offer cost reduction since it is a dry mixing method that does not need a dispersion medium, etc.

(1) Active Material Particles

The active material particles are not particularly limited, as long as they can serve as an electrode active material, more specifically, as long as they can occlude and/or release ions such as lithium ions.

Examples of cathode active material particles include: layered active materials such as $LiCoO_2$, $LiNiO_2$, $LiCo_{1/3}Ni_{1/3}Mn_{1/3}O_2$, $LiVO_2$ and $LiCrO_2$; spinel-type active materials such as $LiMn_2O_4$, $Li(Ni_{0.25}Mn_{0.75})_2O_4$, $LiCoMnO_4$ and $Li_2NiMn_3O_8$; olivine-type active materials such as $LiCoPO_4$, $LiMnPO_4$ and $LiFePO_4$; and NASICON-type active materials such as $Li_3V_2P_3O_{12}$. Of them, preferred are those which contain at least any one of a cobalt element, a nickel element and a manganese element, and which further contain a lithium element and an oxygen element, that is, $LiCoO_2$, $LiNiO_2$, $LiCo_{1/3}Ni_{1/3}Mn_{1/3}O_2$, $LiMn_2O_4$, $Li(Ni_{0.25}Mn_{0.75})_2O_4$, $LiCoMnO_4$, $Li_2NiMn_3O_8$, $LiCoPO_4$ and $LiMnPO_4$. Of them, $LiNi_{1/3}Co_{1/3}Mn_{1/3}O_2$ is particularly preferred.

Examples of anode active material particles include: carbonaceous materials such as mesocarbon microbeads (MCMB), graphite, highly oriented pyrolytic graphite (HOPG), hard carbon and soft carbon; oxides such as $Nb_2O_5$, $Li_4Ti_5O_{12}$ and SiO; lithium metals (Li); lithium alloys such as LiM (where M is Sn, Si, Al, Ge, Sb, P or the like); and metals such as In, Al, Si and Sn. Of them, carbonaceous materials such as graphite, highly oriented pyrolytic graphite (HOPG), hard carbon and soft carbon are preferably used.

In the present invention, there is no clear distinction between the cathode active material and the anode active material. A battery with a desired voltage can be constituted by comparing the charge-discharge potentials of two kinds of compounds and using one with a noble potential in the cathode and one with a base potential in the anode.

In the present invention, the active material particles can be single-crystal particles of an active material, or they can be polycrystalline active material particles in which active material single crystals are bound to each other at the crystal plane level.

In the present invention, the average particle diameter of the active material particles is not particularly limited, as long as it is less than the average particle diameter of the target composite active material powder. The average particle diameter of the active material particles is preferably 0.1 to 30 µm. When the active material particles are polycrystalline active material particles in which active material single crystals are bound to each other, the average particle diameter of the active material particles means the average particle diameter of the polycrystalline active material particles.

In the present invention, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

(2) Composite Particles

In the present invention, the composite particles are particles obtained by coating the surfaces of the active material particles with the oxide-based solid electrolyte. By disposing the oxide-based solid electrolyte between the sulfide-based solid electrolyte and the active material particles, a deterioration in reaction, which is due to a contact between the sulfide-based solid electrolyte and the active material particles, can be inhibited.

The active material particles contained in the composite particles are preferably particles which contain at least any one of a cobalt element, a nickel element and a manganese element, and which further contain a lithium element and an oxygen element. In particular, preferred are $LiCoO_2$, $LiNiO_2$, $LiCo_{1/3}Ni_{1/3}Mn_{1/3}O_2$, $LiMn_2O_4$, $Li(Ni_{0.25}Mn_{0.75})_2O_4$, $LiCoMnO_4$, $Li_2NiMn_3O_8$, $LiCoPO_4$ and $LiMnPO_4$. Particularly preferred is $LiNi_{1/3}Co_{1/3}Mn_{1/3}O_2$.

The oxide-based solid electrolyte contained in the composite particles is not particularly limited, as long as it contains an oxygen element (O) and it has chemical affinity for the active material particles to the extent that it can coat at least part of the surface of each active material particle.

Examples of the oxide-based solid electrolyte include those represented by the general formula $Li_xAO_y$ (where A is B, C, Al, Si, P, S, Ti, Zr, Nb, Mo, Ta or W, and x and y are positive integers) In particular, there may be mentioned $Li_3BO_3$, $Li_2CO_3$, $LiAlO_2$, $Li_4SiO_4$, $Li_2SiO_3$, $Li_3PO_4$, $Li_2TiO_3$, $Li_4Ti_5O_{12}$, $Li_2Ti_2O_5$, $Li_2ZrO_3$, $LiNbO_3$, $Li_2MoO_4$, $Li_2WO_4$, etc. Also, there may be mentioned $Li_2O$—$B_2O_3$—$P_2O_5$, $Li_2O$—$SiO_2$, $Li_2O$—$B_2O_3$, $Li_2O$—$B_2O_3$—$ZnO$, etc. Of them, $LiNbO_3$ is particularly preferably used.

The thickness of the oxide-based solid electrolyte layer coating the active material particles is preferably such a thickness that does not cause a reaction between the sulfide-based solid electrolyte and the active material particles. For example, it is preferably in a range of 0.1 to 100 nm, more preferably in a range of 1 to 20 nm.

The oxide-based solid electrolyte layer is needed to coat 40% or more of the surface of each active material particle. Preferably, the oxide-based solid electrolyte layer coats a larger surface area of each active material particle. More preferably, the layer coats all of the surface of each active material particle. In particular, the coating rate is preferably 70% or more, more preferably 90% or more.

Examples of methods for forming the oxide-based solid electrolyte layer on the surfaces of the active material particles include a tumbling/fluidizing coating method (sol-gel method), a mechanofusion method, a chemical vapor deposition (CVD) method and a physical vapor deposition (PVD) method. As a method for measuring the thickness of the oxide-based solid electrolyte layer, there may be mentioned TEM, for example. As a method for measuring the coating rate of the oxide-based solid electrolyte layer, there may be mentioned TEM and X-ray photoelectron spectroscopy (XPS), for example.

(3) Sulfide-based Solid Electrolyte

The sulfide-based solid electrolyte used in the present invention is not particularly limited, as long as it contains a sulfur element (S); it has chemical affinity for the above-mentioned active material particles or composite particles to the extent that it can coat the surfaces of the active material particles or composite particles; and it has ion conductivity.

The thickness of the sulfide-based solid electrolyte layer coating the surfaces of the active material particles or composite particles is preferably in a range of 0.1 to 1000 nm, more preferably in a range of 1 to 500 nm, for example.

The sulfide-based solid electrolyte layer is needed to coat 40% or more of the surface of each active material particle or composite particle. Preferably, the sulfide-based solid electrolyte layer coats a larger surface area of each particle. More preferably, the sulfide-based solid electrolyte layer coats all of the surface of each active material particle or composite particle. In particular, the coating rate is preferably 70% or more, more preferably 90% or more. The sulfide-based solid electrolyte coating state can be qualitatively confirmed by TEM, SEM, etc.

The form of the sulfide-based solid electrolyte used for mixing/kneading is not particularly limited. Preferred is a particle form.

In the case where the composite active material powder of the present invention is used in an all-solid-state lithium battery, as the sulfide-based solid electrolyte, there may be mentioned $Li_2S$—$SiS_2$-based solid electrolytes, $Li_2S$—$P_2S_3$-based solid electrolytes, $Li_2S$—$P_2S_5$-based solid electrolytes, $Li_2S$—$GeS_2$-based solid electrolytes, $Li_2S$—$B_2S_3$-based solid electrolytes, $Li_3PO_4$—$P_2S_5$-based solid electrolytes, and $Li_4SiO_4$—$Li_2S$—$SiS_2$-based solid electrolytes, for example. More specifically, there may be mentioned $Li_2S$—$P_2S_5$, $Li_2S$—$P_2S_3$, $Li_2S$—$P_2S_3$—$P_2S_5$, $Li_2S$—$SiS_2$, $Li_2S$—$P_2S_5$—LiI, LiI—$Li_2S$—$SiS_2$—$P_2S_5$, LiI—LiBr—$Li_2S$—$P_2S_5$, LiI—LiBr—$Li_2S$—$SiS_2$—$P_2S_5$, $Li_2S$—$SiS_2$—$Li_4SiO_4$, $Li_2S$—$SiS_2$—$Li_3PO_4$, $Li_2S$—$GeS_2$, $Li_3PS_4$—$Li_4GeS_4$, $LiGe_{0.25}P_{0.75}S_4$, $Li_2S$—$B_2S_3$, $Li_{3.4}P_{0.6}Si_{0.4}S_4$, $Li_{3.25}P_{0.25}Ge_{0.76}S_4$, $Li_{4-x}Ge_{1-x}P_xS_4$ and $Li_7P_3S_{11}$. Of them, preferred is $Li_2S$—$P_2S_5$—LiI.

The sulfide-based solid electrolyte can be a sulfide glass or a crystallized sulfide glass obtained by heating a sulfide glass.

Figure 4:
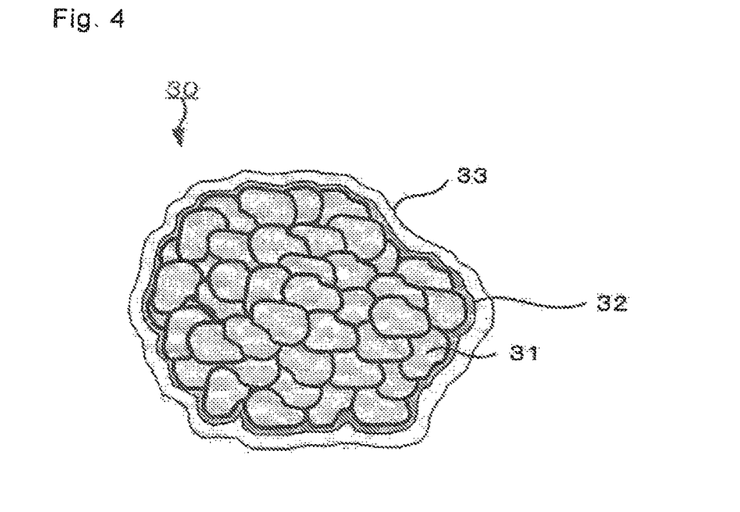
FIG. 4 is a schematic sectional view of an embodiment of a composite active material powder.

FIG. 4 is a schematic sectional view of an embodiment of the composite active material powder provided by the present invention. The purpose of FIG. 4 is to qualitatively explain the material coating state in an embodiment, and it is not a view that qualitatively reflects the particle size of the actual solid electrolyte, the coating state of the solid electrolyte, the thickness of the solid electrolyte layer, etc.

As shown in FIG. 4, a composite active material powder 30 contains composite particles, in which all of the surfaces of active material particles 31 are coated with an oxide-based solid electrolyte layer 32, and a sulfide-based solid electrolyte layer 33, with which all of the surfaces of the composite particles is coated.

The composite active material powder provided by the present invention can be used in electrode active material layers (cathode and anode active material layers) and is preferably used in the electrode active material layers of an all-solid-state battery. This is because electrode active material layers with excellent electron conductivity and large charge-discharge capacity can be obtained.

Examples of methods for forming electrode active material layers include a method for compression molding an electrode mixture that contains the composite active material powder. For example, an all-solid-state battery can be produced by stacking a cathode mixture and an anode mixture through a solid electrolyte layer.

The method for producing the electrode mixture is not particularly limited. For example, it can be produced by mixing the composite active material powder, an electroconductive material and a binder at a desired ratio.

The content of the composite active material powder in the electrode mixture is preferably in a range of 10 to 99% by mass, for example.

The electroconductive material is not particularly limited, as long as it can increase the electron conductivity of electrodes.

Examples of the electroconductive material include acetylene black, Ketjen Black and carbon fibers. The content of the electroconductive material in the electrode mixture varies depending on the type of the electroconductive material. It is generally in a range of 1 to 30% by mass.

As needed, the electrode mixture can contain a binder. Examples of the binder include fluorine resins such as polyvinylidene fluoride (PVdF) and polytetrafluoroethylene (PTFE), and elastic resins such as butadiene rubber (BR). No particular limitation is imposed on the elastic resins, and a hydrogenated butadiene rubber or a hydrogenated butadiene rubber in which a functional group is introduced in a terminal thereof, can be preferably used. They can be used alone or in combination of two or more kinds. The content of the binder in the electrode mixture is needed to be an amount that can fix the cathode active material, etc., and it is preferably small. The binder content is generally in a range of 1 to 10% by mass.

The method for mixing them is not particularly limited and can be wet mixing or dry mixing.

In the case of wet mixing, for example, there may be mentioned a method in which the composite active material powder, the electroconductive material, the sulfide-based solid electrolyte particles, the binder and a dispersion medium are mixed to produce a slurry, and the slurry is dried. As the dispersion medium, there may be mentioned butyl butyrate, butyl acetate, dibutyl ether, heptane, etc.

In the case of dry mixing, for example, there may be mentioned a method in which the composite active material powder, the electroconductive material, the sulfide-based solid electrolyte particles and the binder are mixed with a mortar or the like.

A current collector can be provided to the electrode active material layer formed from the electrode mixture. The structure and form of the current collector and the material therefor are not particularly limited, as long as the current collector has desired electron conductivity. As the material for the current collector, for example, there may be mentioned gold, silver, palladium, copper and nickel.

The composite active material powder provided by the present invention can be used in many types of batteries, in addition to lithium secondary batteries, depending on the materials used therefor (electrode active material, solid electrolyte, etc.)

EXAMPLES

Example 1

First, composite particles in which $LiNi_{1/3}Co_{1/3}Mn_{1/3}O_2$ particles (active material particles) are coated with $LiNbO_3$ (oxide-based solid electrolyte) were prepared (average particle diameter 6 μm).

Next, 20 g of the composite particles and 4 g of $60Li_2S$-$20P_2S_5$-$20LiI$ particles (sulfide-based solid electrolyte, average particle diameter 0.8 μm) were put into a dry mixing/kneading machine (product name: NOB-MINI; manufactured by: Hosokawa Micron Corporation) and mixed and kneaded for 10 minutes under the following conditions, thereby producing a composite active material powder.

Thickness of each blade: 6 mm
Width of the end surface of the end part of each blade: 1 mm
Length of the end part of each blade: 5.0 mm
Total length of each blade: 18.9 mm
Diameter of the rotating shaft of a rotating body: 50 mm
Clearance: 1 mm
Inclined angle: 45°
Peripheral speed: 18.5 m/s Example 2

A composite active material powder was produced in the same manner as Example 1, except that the width of the end surface of the end part of each blade was changed to 2.5 mm, and the thickness of each blade was changed to 7.5 mm.

Example 3

A composite active material powder was produced in the same manner as Example 1, except that the width of the end surface of the end part of each blade was changed to 5 mm, and the thickness of each blade was changed to 10 mm.

Comparative Example 1

First, composite particles in which $LiNi_{1/3}Co_{1/3}Mn_{1/3}O_2$ particles (active material particles) are coated with $LiNbO_3$ (oxide-based solid electrolyte) were prepared (average particle diameter 6 μm).

Next, 20 g of the composite particles and 4 g of $60Li_2S$-$20P_2S_5$-$20LiI$ particles (sulfide-based solid electrolyte, average particle diameter 0.8 μm) were subjected to dry mixing (spatula mixing) for 10 minutes, thereby producing a composite active material powder.

Comparative Example 2

A composite active material powder was produced in the same manner as Example 1, except that the thickness of each blade was changed to 1 mm, and any tapered section was not formed at the end part of each blade (that is, both the thickness of each blade and the width of the end surface of the end part of each blade were set to 1 mm).

Comparative Example 3

A composite active material powder was produced in the same manner as Example 1, except that the thickness of each blade was changed to 2.5 mm, and any tapered section was not formed at the end part of each blade (that is, both the thickness of each blade and the width of the end surface of the end part of each blade were set to 2.5 mm).

Comparative Example 4

A composite active material powder was produced in the same manner as Example 1, except that the thickness of each blade was changed to 5 mm, and any tapered section was not formed at the end part of each blade (that is, both the thickness of each blade and the width of the end surface of the end part of each blade were set to 5 mm).

[Battery Production]

Hereinafter, all-solid-state lithium secondary batteries were produced using the composite active material powders of Examples 1 to 3 and Comparative Examples 1 to 4 as a cathode active material.

The composite active material powders were prepared as the cathode active material; $60Li_2S$-$20P_2S_5$-$20LiI$ particles were prepared as a sulfide-based solid electrolyte; vapor-grown carbon fibers (VGCF) were prepared as an electroconductive material; and PVdF was prepared as a binder. Each of the cathode active materials, the sulfide-based solid electrolyte, the electroconductive material and the binder were prepared at the following ratio: cathode active material/sulfide-based solid electrolyte/electroconductive material/binder=81.3% by mass/16.6% by mass/1.3% by mass/0.8% by mass. Then, 13 g of butyl butyrate was added thereto, and the mixture was subjected to wet mixing for 2 minutes with an ultrasonic homogenizer, thereby preparing a cathode mixture.

As the raw material for a separator layer (solid electrolyte layer), $60Li_2S$-$20P_2S_5$-$20LiI$ particles (sulfide-based solid electrolyte) were prepared.

Natural black lead was prepared as an anode active material; $60Li_2S$-$20P_2S_5$-$20LiI$ particles were prepared as a sulfide-based solid electrolyte; and PVdF was prepared as a binder. The anode active material, the sulfide-based solid electrolyte and the binder were prepared at the following ratio: anode active material/sulfide-based solid electrolyte/binder=54.8% by mass/43.4% by mass/1.8% by mass. Then, 13 g of butyl butyrate was added thereto, and the mixture was subjected to wet mixing for 2 minutes with an ultrasonic homogenizer, thereby preparing an anode mixture.

First, as the separator layer, a pressed powder was formed by pressing the $60Li_2S$-$20P_2S_5$-$20LiI$ particles. Next, the cathode mixture was disposed on one surface of the pressed powder, and the anode mixture was disposed on the other surface. The resultant was subjected to flat pressing at a press pressure of 6 ton/cm$^2$ ($\approx$588 MPa) for a pressing time of 1 minute, thereby obtaining a laminate. For the laminate thus obtained, the thickness of the cathode mixture layer was 30 μm; the thickness of the anode mixture layer was 45 μm; and the thickness of the separator layer was 300 μm. The laminate was held at a pressure of 0.2 N in the laminating direction, thereby producing an all-solid-state lithium secondary battery.

Hereinafter, the all-solid-state lithium secondary batteries in which the composite active material powders of Examples 1 to 3 and Comparative Examples 1 to 4 were used as a raw material, are referred to as all-solid-state lithium secondary batteries of Examples 1 to 3 and Comparative Examples 1 to 4.

[Measurement of Internal Resistance of all-solid-state Lithium Secondary Batteries]

For the all-solid-state lithium secondary batteries of Examples 1 to 3 and Comparative Examples 1 to 4, the internal resistance was measured by the 10s-DCIR method. Details of the measurement method are as follows.

OCV potential: 3.52 V
Current density: 15.7 mA/cm$^2$

The internal resistance was calculated by Ohm's law, from the overvoltage and current value which were measured 10 seconds after discharge.

The internal resistances of the all-solid-state lithium secondary batteries of Examples 1 to 3 and Comparative Examples 1 to 4 are shown in Table 1.

TABLE 1

|  | Tapered section | Inclined angle (°) | Blade thickness (mm) | Width of end surface of end part (mm) | Length of end part (mm) | Internal resistance (Ω/cm$^2$) |
|---|---|---|---|---|---|---|
| Example 1 | Formed | 45 | 6 | 1 | 5 | 100.1 |
| Example 2 | Formed | 45 | 7.5 | 2.5 | 5 | 81 |
| Example 3 | Formed | 45 | 10 | 5 | 5 | 72.8 |
| Comparative Example 1 | — | — | — | — | — | 149.8 |
| Comparative Example 2 | Not formed | — | 1 | 1 | — | 120.2 |
| Comparative Example 3 | Not formed | — | 2.5 | 2.5 | — | 104.7 |
| Comparative Example 4 | Not formed | — | 5 | 5 | — | 110.3 |

As shown in Table 1, the internal resistances of the all-solid-state lithium secondary batteries of Examples 1 to 3 and Comparative Examples 1 to 4 are as follows: 100.1 $\Omega/cm^2$ in Example 1; 81.0 $\Omega/cm^2$ in Example 2; 72.8 $\Omega/cm^2$ in Example 3; 149.8 $\Omega/cm^2$ in Comparative Example 1; 120.2 $\Omega/cm^2$ in Comparative Example 2; 104.7 $\Omega/cm^2$ in Comparative Example 3; and 110.3 $\Omega/cm^2$ in Comparative Example 4.

As shown in Table 1, the internal resistances of the all-solid-state lithium secondary batteries of Examples 1 to 3 are to 51% smaller than the internal resistance of Comparative Example 1 in which the device for producing the composite active material powder was not used.

Also, the internal resistances of the all-solid-state lithium secondary batteries of Examples 1 to 3 are 4 to 39% smaller than those of all-solid-state lithium secondary batteries of Comparative Examples 2 to 4 in which the blades that do not have a tapered section at the end part thereof, were used.

As the result of comparing Example 1 and Comparative Example 2, in both of which the composite active material powder was produced under the condition that the width of the end surface of the end part of each blade is 1 mm, the internal resistance of the all-solid-state lithium secondary battery of Example 1 is 17% smaller than the all-solid-state lithium secondary battery of Comparative Example 2. As the result of Example 2 and Comparative Example 3, in both of which the composite active material powder was produced under the condition that the width of the end surface of the end part of each blade is 2.5 mm, the internal resistance of the all-solid-state lithium secondary battery of Example 2 is 23% smaller than that of the all-solid-state lithium secondary battery of Comparative Example 3. As the result of comparing Example 3 and Comparative Example 4, in both of which the composite active material powder was produced under the condition that the width of the end surface of the end part of each blade is 5 mm, the internal resistance of the all-solid-state lithium secondary battery of Example 3 is 34% smaller than that of the all-solid-state lithium secondary batter of Comparative Example 4. Therefore, it is clear that in the case where the widths of the end surfaces of the end parts of the blades are the same, the internal resistances becomes 17 to 34% smaller, depending on the presence of the tapered section.

As the result of comparing Examples 1 to 3, it is clear that the internal resistance of the all-solid-state lithium secondary battery of Example 3 is the smallest, and the internal resistance of the all-solid-state lithium secondary battery of Example 2 is the smallest next to Example 3.

Therefore, it is clear that by having the tapered section and increasing the width of the end surface of the end part of each blade, the coating efficiency is increased, and the internal resistance of the all-solid-state lithium secondary battery is decreased.

From the above, it is clear that the composite active material powder produced using the device for producing the composite active material powder according to the present invention, has a function to reduce the internal resistance of a battery more than conventional composite active material powders.

REFERENCE SIGNS LIST

In the accompanying drawings,
11. Storage body
12. Inner wall surface
13. Rotating body
14. Rotating shaft
15. Blade
16. Bearing
17. Motor
19. End part of blade
20. Inclined angle of tapered section
21. End surface of end part of blade
22. Clearance
23. Width of end surface of end part of blade
24. Thickness of blade
25. Length of end part of blade
26. Total length of blade
27. Diameter of rotating shaft of rotating body
28. Inclined surface of tapered section
30. Composite active material powder
31. Active material particle
32. Oxide-based solid electrolyte layer
33. Sulfide-based solid electrolyte layer
100. Device

The invention claimed is:

1. A method for producing a composite active material powder,
wherein surfaces of active material particles or composite particles, which are obtained by coating the surfaces of the active material particles with an oxide-based solid electrolyte, are coated with a sulfide-based solid electrolyte by preparing a production device, putting the sulfide-based solid electrolyte and any one of the active material particles and the composite particles into a storage body of the production device, and then rotating a rotating body;
wherein the production device comprises:
the storage body which has a cylindrical inner wall surface; and
the rotating body which is disposed in an internal space that is surrounded by the inner wall surface of the storage body, which has a rotating shaft that is aligned with a central axis of the internal space, and which includes a plurality of blades,
wherein each blade has a leading side and a substantially planar trailing side in a rotation/movement direction of the rotating body, and an end part which adjoins the leading side and the substantially planar trailing side, respectively, the end part having a tapered section at the leading side in which the thickness of the blade gradually tapers toward a blade end, and at which blade end, the end part transitions into a curved end surface which directly adjoins the substantially planar trailing side of the blade, and the curved end surface faces the inner wall surface of the storage body and is generally parallel to the inner wall surface of the storage body, and
wherein a width of the curved end surface of the end part of each blade is in a range of 0.1 to 0.7 with respect to the thickness of the blade.

2. The method for producing the composite active material powder according to claim 1, wherein a width of the curved end surface of the end part of each blade is in a range of ⅙ to ½ with respect to the thickness of the blade.

3. The method for producing the composite active material powder according to claim 1, wherein, in a rotating shaft direction front view of the rotating body, a length of the end part of each blade in a radial direction of the rotating body is 0.5 to 30 mm.

4. The method for producing the composite active material powder according to claim 1, wherein the width of the curved end surface of the end part of each blade is 0.5 to 30 mm.

5. The method for producing the composite active material powder according to claim 1, wherein a clearance between the curved end surface of the end part of each blade and the inner wall surface of the storage body is 0.5 to 10 mm.

6. The method for producing the composite active material powder according to claim 1, wherein, in the rotating shaft direction front view of the rotating body, an inclined angle of the tapered section is 10 to 80° to a tangent line at a point of intersection between an inclined surface of the tapered section and the inner wall surface of the storage body.

7. The method for producing the composite active material powder according to claim 1, wherein the active material particles are particles which contain at least any one of a cobalt element, a nickel element and a manganese element, and which further contain a lithium element and an oxygen element.

\* \* \* \* \*